United States Patent [19]

Tsumura et al.

[11] E Re. 28,810

[45] Reissued May 11, 1976

[54] PREPARATION OF SOY CHEESE

[75] Inventors: Haruo Tsumura, Osaka; Yukio Hashimoto, Izumi; Hayata Kubota, Izumiotsu, all of Japan

[73] Assignee: Fuji Oil Co., Ltd., Osaka, Japan

[22] Filed: Sept. 8, 1975

[21] Appl. No.: 611,186

Related U.S. Patent Documents

Reissue of:

[64] Patent No.: 3,857,970
Issued: Dec. 31, 1974
Appl. No.: 351,813
Filed: Apr. 17, 1973

[30] Foreign Application Priority Data

Apr. 17, 1972 Japan ..... 47-38421
Apr. 20, 1972 Japan ..... 47-39852

[52] U.S. Cl. ..... 426/46; 426/36; 426/38; 426/39; 426/40

[51] Int. Cl.[2] ..... A23C 19/02

[58] Field of Search ..... 426/46, 36, 37, 38, 426/39, 40, 582, 598, 607

[56] References Cited

UNITED STATES PATENTS

| | | | |
|---|---|---|---|
| 1,082,118 | 12/1913 | Gossel | 426/598 |
| 2,892,721 | 6/1959 | Nelson | 426/607 |
| 3,743,516 | 7/1973 | Lundstedt et al. | 426/38 |

FOREIGN PATENTS OR APPLICATIONS

| | | |
|---|---|---|
| 45-22500 | 12/1966 | Japan |

OTHER PUBLICATIONS

Hang et al., Preparation of Soybean Cheese Using Lactic Starter Organisms, Food Technology, Vol. 21, 1967, (pp. 1033-1038) TX341F87.

*Primary Examiner*—David M. Naff

[57] ABSTRACT

A soy cheese having superior texture and body characteristics is made without milk solids by coagulating a fermented emulsion containing soy milk and a fat composition with about 0.05 to about 1.0 weight percent of a coagulant selected from the group consisting of aldonic acid lactones, uronic acid lactones, and mixtures thereof. A flavor producing proteolytic enzyme can be added to the soy milk before formation of the emulsion, to the emulsion prior to fermentation, or to the cooked curd without adversely affecting the texture and body of the resultant soy cheese.

11 Claims, No Drawings

PREPARATION OF SOY CHEESE

Matter enclosed in heavy brackets [ ] appears in the original patent but forms no part of this reissue specification; matter printed in italics indicates the additions made by reissue.

BACKGROUND OF THE INVENTION

This invention relates to a cheese-like foodstuff made from soy protein and a method for preparing same.

Considerable effort has been directed to preparing cheese-like foodstuffs from protein extracted from soy beans. This so-called soy cheese has many advantages over natural cheeses made from dairy materials because of the limited, and often unstable supply of dairy materials, health problems associated with foodstuffs having high milk fat content, and the substantially lower cost of soy protein as compared to dairy materials. Prior attempts to produce soy cheese has not been adopted commercially to any great extent because it is very difficult to obtain a soy cheese having body and texture comparable to natural cheese. When conventional coagulants, such as calcium sulfate, are used with fermented soy milk, the resultant curd generally is much weaker than curd produced from dairy materials, i.e., the curd is extremely brittle. Consequently, in prior art soy cheese making processes, it has been necessary to use texture reinforcement additives, such as milk solids and/or alkaline metal caseinates. The use of such additives tend to minimize or eliminate many of the potential advantages of soy cheese.

It is well known that soy milk can be treated with proteolytic enzymes (proteases) to deodorize the soy milk and thereby minimize unpleasant beany flavor frequently associated therewith. This treatment tends to inhibit curd formation in prior art cheese making processes and, therefore, has not been considered to be an available alternative in these processes.

SUMMARY OF THE INVENTION

An object of this invention is to provide a process for making a cheese-like foodstuff having good texture and body characteristics from soy protein without adding milk solids, alkaline metal caseinates, or other texture reinforcement additives.

Another object of this invention is to provide such a process wherein proteolytic enzymes can be added to minimize the beany taste of soy milk.

A further object of this invention is to provide a soy cheese which does not contain milk solids, alkaline metal caseinates or other texture reinforcement additives.

Other objects, aspects, and advantages of the invention will become apparent to those skilled in the art upon reviewing the following detailed description and the appended claims.

It has been found that, in order to obtain a curd having the desired texture and body characteristics for the production of an acceptable soy cheese, the soy milk must be coagulated as slowly as possible. It has also been found that salts of alkaline earth metals, such as magnesium sulfate, calcium sulfate, magnesium chloride and calcium chloride, customarily used as a coagulant in prior art processes for making soy cheese do not provide the desired coagulation of soy milk.

Similarly, rennet customarily used in the production of natural cheese does not provide the desired coagulation.

In accordance with the invention, a mixture containing soy milk and fat, preferably a synthetic fat derived from animal fats (other than milk fat) and/or vegetable fats and having physico-chemical characteristics simulating those of milk fat, is fermented with a conventional lactic acid forming cheese starter culture and from about 0.05 to about 1.0 weight percent, based on the weight of the soy milk, of a coagulant selected from the group consisting of aldonic acid lactones, uronic acid lactones, and mixtures thereof, is added to the fermented mixture to form a curd. The curd is then drained, formed into the desired shape, and aged in the usual manner to produce a soy cheese having improved texture and body characteristics. If desired, proteolytic enzymes (proteases) can be added to the soy milk prior to formation of the mixture, to the mixture before fermentation is commenced, or to the cooked curd to improve the flavor characteristics of the resultant soy cheese without adversely affecting the texture and body characteristics thereof.

DESCRIPTION OF THE PREFERRED EMBODIMENTS

The soy milk used in the invention generally can be prepared from any soy protein containing material which is derived from soy beans and is suitable for making a cheese-like foodstuff. Commercially available soy protein concentrates which are extracted from the soy beans by conventional techniques can be used. For example, the soy milk can be formed by dissolving or dispersing a soy flour, a deffated soy flour, or isolated soy protein in water, the weight of the water used being about 7 to about 10 times that of the protein containing material. When soy flour or defatted soy flour is used as the soy protein containing material, the water is heated to about 40° to 60°C, preferably about 50°C. Extraction temperatures higher than about 60°C should be avoided to prevent denaturation of soy protein in the soy milk. In order to minimize undesirable taste characteristics in the final product, the bean refuge compounds are preferably removed from the resultant soy milk before being used in the invention. Generally, the concentration of soy protein in the soy milk is within the range of about 2.5 to about 5.5 weight percent and, preferably within the range of about 3.5 to about 4 weight percent.

The soy milk is admixed with a fat such as milk fat or other fat compositions having physico-chemical properties resembling those of milk fat. Generally, any synthetic fat composition derived from animal fats (other than milk fat) and/or vegetable fats and which has physico-chemical properties approximating the well recognized physico-chemical properties of milk fat, such as the short chain fatty acids composition (particularly $C_4$ and $C_6$ fatty acids), saponification value, softening point, iodine value, etc., can be used. Fats having a melting point of 25°–40°C, preferably 30°–35°C, and a SCI curve similar to that of milk fat can be used.

A preferred synthetic fat composition containing at least $C_4$ and/or $C_6$ fatty acids is prepared by blending one or more compounds having lower alkanoyl radicals of 12 carbon atoms or less with natural fats (other than milk fat) and interesterifying the resultant blend. Esters derived from lower fatty acids and alcohols, such as monobasic lower aliphatic alcohols, di-basic lower aliphatic alcohols, glycerol, and the like can be used as a source of lower alkanoyl radicals included in the blend. Representative examples of these esters include ethyl ester of butyric acid, butyl ester of butyric acid, di-ester of butyric acid with ethylene glycol, triglycerides of butyric acid (tributyrin), triglyceride of caproic acid (tricaproin), triglyceride of caprylic acid (tricaprylin), triglyceride of capric acid (tricaprin), triglyceride of lauric acid (trilaurin), and the like.

Representative examples of natural fats which can be used in the above blend includes animal fats, such as beef tallow, lard, hardened fish oil, and hardened whale oil, and vegetable fats, such as palm oil, coconut oil, palm kernel oil, soy bean oil, rape seed oil, and cotton seed oil. The natural fats used can be hydrogenated or fractionated.

When only compounds containing butyloyl ($C_4$) and/or caproyl ($C_6$) radicals are used in preparing the above preferred fat composition, a sufficient quantity should be added to produce a resultant fat composition having a total amount of butyric and/or caproic acid of about 1 to about 20 weight percent, based on the total weight of the fatty acids in the composition (calculated as the acid). Generally, a natural cheese-like flavor is not imparted to the resultant soy cheese when the total amount of these two short chain fatty acids in the fat composition is below 1 weight percent. On the other hand, a bitter flavor is imparted to the resultant soy cheese when the total amount of these two short chain fatty acids in the fat composition is above 20 weight percent.

A soy cheese having a flavor profile more closely resembling natural cheese can be obtained by using a synthetic fat composition which also includes appropriate amounts of $C_8$, $C_{10}$, and $C_{12}$ fatty acid radicals. A particularly advantageous synthetic fat composition is prepared by interesterifying a blend of non-milk, natural fats and lower alkanoyl radical-containing compounds to produce a resultant fat composition including about 2 to about 8 weight percent butyric acid ($C_4$), about 0.5 to about 4 weight percent caproic acid ($C_6$), about 1 to about 4 weight percent caprylic acid ($C_8$), about 1 to about 4 weight percent capric ($C_{10}$) and about 2 to about 6 weight percent lauric acid ($C_{12}$), all based on the total weight of the fatty acids in the composition and calculated as the acid.

As mentioned above, a preferred synthetic fat composition is produced by interesterifying the blend of natural fats and lower alkanoyl radical-containing compounds. This interesterification can be accomplished in any conventional manner. The compounds of the blend are preferably purified via contentional deacidification, de-colorization, and deodorization techniques prior to interesterification to prevent discoloration. Representative interesterification techniques includes the step of heating the mixture to a temperature of about 50°–100°C in the presence of a catalyst, such as sodium methylate, sodium hydroxide, stannous chloride or the like. For example, complete interesterification can be achieved by agitating the blend in the presence of sodium methylate at 70°C for one hour. The resultant interesterified fat composition is then washed, bleached, and deodorized in the conventional manner and is ready for use in this invention.

An appropriate amount of the fat is blended with the soy milk to form an oil-in-water emulsion. The proportions of fat and soy milk used to form the emulsion can vary widely. Generally, the amount of fat used in the emulsion can be within the range of about 2 to about 6 weight percent, preferably about 3 to about 4 weight percent, based on the total weight of the emulsion. Although a satisfactory emulsion can be prepared without an emulsifier because of the excellent emulsifying of soy protein, one or more suitable edible emulsifiers. such as lecithin, mono-and diglycerides of higher fatty acids, polyethylene sorbitane, higher mono-fatty acid esters and the like can be added to aid in the emulsification if desired. The mixture of fat and soy milk is preferably maintained at a temperature of about 50° to 60°C during emulsification in order to obtain good emulsifying. Other additives, such as sugar, edible dyes, vitamins, preservatives, flavoring additives, etc. can be used if desired. Also, sugars, such as glucose, lactose, or the like, are preferably added to the emulsion to accelerate the fermentation activity of the lactic acid-forming starter culture subsequently added to the emulsion.

The emulsion is preferably heated to a temperature in the range of about 90° to about 150°C, most preferably about 98° to about 100°C for about 5 minutes; cooled (e.g. about 50°C); and then homogenized to achieve a maximum dispersion of fat globules into a stable emulsion. This treatment improves the elastic mouth feeling of the resultant soy cheese product which is a common defect of a fat-deficient cheese products. Either single or two-stage homogenization can be used.

The emulsion is inoculated with a suitable lactic acid-forming cheese starter culture and incubated. One or more heat tolerant lactic acid-forming bacteria, such as Streptococcus thermophilus, Lactobacillus bulgaricus or similar lactic acid-forming starter cultures conditioned to the fermentation temperature used, can be utilized as the starter. Starter cultures having good ability for forming diacetyl and acetoin are preferred. The amount of starter culture used depends primarily upon the acid-forming ability of the particular culture used. Generally, the amount will normally be about 2 to about 3 weight percent, based on the total weight of the emulsion.

If desired, a suitable flavor producing proteolytic enzyme (proteases) can be added either to the soy milk prior to formation of the emulsion or to the emulsion prior to innoculations. Representative examples of suitable proteolytic enzymes include papain, bromelain, "microbial rennets" derived from Mucor pusillus Lindt in accordance with U.S. Arima et al, U.S. Pat. No. 3,151,039 issued Sept. 29, 1964, pregastric esterases produced in accordance with U.S. Farnham U.S. Pat. No. 2,794,743 issued June 4, 1957, "Molsin" derived from Asperigillus saitoi and marketed by Seishin Seiyaku Co., Tokyo, Japan, "Amano G" derived from Rhizopus sp. and marketed by Amano Pharmaceutical Co., Nagoya, Japan, and "Rapidase" derived from Trametes sanguinea and marketed by Takada Chemical Industries, Ltd., Osaka, Japan.

An appropriate amount of one or more flavor producing proteolytic enzymes is added to eliminate the beany odor without generating a bitter taste in the resultant cheese-like product enhancement.

For example, the appropriate amount of any particular proteolytic enzyme can be determined by measuring the Nitrogen Solubility Index (NSI) of soy cheese which has been aged for 2–3 months. Preferably, the amount of proteolytic enzyme is limited to a level where the Nitrogen Solubility Index relative to a 0.2 mol percent solution of trichloroacetic acid is 30 percent or less. If desired, the proteolytic enzyme can be added to the curd after cooking.

After the acidity of the fermenting broth reaches about 0.20, a coagulant selected from the group consisting of aldonic acid lactones, uronic acid lactones, and mixtures thereof is added to form a curd. Suitable coagulants include the intermolecular dehydration products of $\gamma$ - or $\delta$ - hydroxy sugar acids such as D-xylo- $\delta$ -lactone, D-glucono- $\delta$ -lactone, D-galacto- $\delta$ -lactone and the like. D-glucono- $\delta$ -lactone, presently the most preferred coagulant, is represented by the following formula:

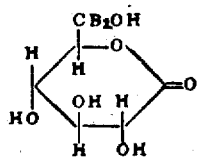

The amount of coagulant used is within the range of 0.05 to 1 weight percent, preferably within the range of 0.1 to 0.5 weight percent, based on the weight of the soy milk in the emulsion. Amounts of coagulant below about 0.05 weight percent do not provide adequate coagulation and amounts in excess of about 1 weight percent produces excessive acidity in the soy cheese product. The coagulation step is carried out at a temperature within the range of about 40° to about 70°C, preferably within the range of about 50° to about 60°C. Generally, coagulating temperature above 70°C produces a curd having a texture which is undesirable for producing good soy cheese. At temperatures below about 40°C, coagulation progresses at an impractically slow rate.

The resulting curd is then, in accordance with conventional making techniques, cooked, formed into the desired shape, and aged to produce a soy cheese. For example, the curd is subjected to the following unit process steps: (1) cutting and breaking, (2) separating whey therefrom, (3) cooking, (4) draining, (5) dipping, (6) molding, (7) pressing, (8) salting, and (9) aging.

The soy cheese produced in accordance with the invention has good texture and body characteristics even though milk solids and/or alkaline metal caseinates are not used. A further advantage of the invention is that aging of the curd takes place smoothly with little regard for contamination by miscellaneous bacteria because it is maintained at a comparatively strong acidity by the sugar acids generated from the coagulant used. The use of the particular class of coagulants in accordance with the invention permits the use of flavor producing proteolytic enzymes to improve both the physical organoleptic properties, without adversely weakening the texture and the body, of the resultant soy cheese product.

The following examples are provided to illustrate the invention and are not to be construed as limitations thereto:

EXAMPLE 1

1,000 grams of soy milk extracted from a defatted soy flour with warm water and having crude protein content of 3.6 percent were mixed with 20 grams of glucose and 30 grams of a synthetic fat composition having physico-chemical characteristics simulating milk fat to form an emulsion. The fat composition had a softening point of 32.4°C and the following short change fatty acid composition: $C_4$=3.04 wt. %, $C_6$=1.8 wt. %, $C_8$=1.3 wt. %, $C_{10}$=2.6 wt. %, $C_{12}$=2.9 wt. %, all based on the total weight of fatty acid in the composition, calculated as the acid. After being heated to 90°C for 10 minutes and cooled, the emulsion was innoculated with 20 ml. of a cheese starter culture derived from Streptococcus thermophilus (live bacteria count about $10^7$/ml. to $10^8$/ml.) and maintained at a temperature of 50°C until the acidity of the emulsion increased to 0.20 (i.e. about 1 hour). 2 grams of D-glucono-δ-lactone (hereinafter referred to as GDL) was added to the resultant broth. The broth was maintained at 50°C until a curd was formed. The curd was cut with a knife and then cooked at 55°C. After draining and light pressing of the curd to remove the whey, the curd was salted with 2–3 wt. % salt, molded, pressed, coated with praffin, and aged for 2–3 months at 15°C to produce a soy cheese sample in accordance with the invention, which sample is designated as A in Table I below.

A separate control sample, designated as B in Table I below, was prepared in substantially the same manner, except 3 grams of calcium sulfate was used as the coagulant instead of GDL.

After two months aging, the physical properties of the two soy cheese samples were compared. The soy cheese sample (A) made in accordance with the invention exhibited uniform texture and body, while the texture of the control soy cheese sample (B) was very fragile and uneven.

Both of the above samples and a sample of Gouda cheese, a hard type natural cheese designated as C in Table I below, were tested with a Texturometer (marketed by Zenken Co., Ltd., Tokyo, Japan) to determine certain physical characteristics. The results of this test are tabulated in Table I below.

TABLE I

| Parameter | Samples A | B | C |
|---|---|---|---|
| Hardness | 8.9 | 6.7 | 10.2 |
| Cohesiveness | 0.69 | 0.54 | 0.67 |
| Springiness | 11 | 11 | 11 |
| Adhesiveness | 0 | 0 | 0.42 |
| Chewiness[1] | 67.4 | 39.8 | 75.2 |

[1]Expressed mathematically as the product of Hardness, Cohesiveness, and Springiness.

From these results it can be seen that most of the physical properties of the soy cheese sample (A) made in accordance with the invention were superior to those of the control sample (B) and approached those of a natural cheese (C).

EXAMPLE 2

A sample of soy cheese according to the invention and a control sample of soy cheese were prepared in the same manner as described in Example 1 except about 0.04 weight percent, based on the total weight of the cooked curd, of papain was added to said cooked curd at molding.

The texture and body of the enzyme-treated control sample was substantially weaker than that of the untreated control sample of Example 1. On the other hand, the texture and body of the enzyme-treated sample of soy cheese made in accordance with the invention was substantially the same as the untreated sample of the invention produced in Example 1 and exhibited a superior natural cheese-like flavor profile. The en- :yme treated samples were tested with a Texturometer n the same manner as described in Example 1. The ıardness and chewiness of the enzyme treated sample nade in accordance with the invention were respecively 1.6 and 1.4 times greater than that of the enzyme reated control sample.

From these test results, it can be seen that the characeristic texture weakening associated with the addition ıf proteolytic enzymes in prior art soy cheese making ıroccsses does not exist in the process of this invention.

We claim:

1. A process for making a cheese-like food from soy nilk comprising preparing an emulsion containing soy milk and an edible fat in sufficient amounts to form an oil-in-water emulsion;

inoculating said emulsion with a lactic acid-forming cheese starter culture and incubating the inoculated emulsion to form a fermented broth;

adding to said fermented broth a coagulant selected from the group consisting of aldonic acid lactones, uronic acid lactones and mixtures thereof;

heating the resultant mixture to a temperature within the range of about 40° to 70° C. and maintaining the mixture at said temperature for a time sufficient to form a curd therefrom;

separating whey from said curd;

cooking said curd; and aging said cooked curd.

2. A process according to claim 1 wherein said temperature is within the range of about 50° to about 60°C.

3. A process according to claim 1 wherein the amount of said coagulant is within the range of 0.05 to 1 weight percent, based on the weight of said soy milk.

4. A process according to claim 1 wherein a flavor producing proteolytic enzyme is added either to said soy milk prior to formation of said emulsion, or to said emulsion prior to the initiation of the fermentation, or to said curd after cooking.

5. A process according to claim 1 wherein said coagulant is D-glucono-δ-lactone.

6. A process according to claim 3 wherein said coagulant is D-glucono-δ-lactone.

7. A process according to claim 1 wherein said fat comprises a synthetic fat composition having physical and chemical properties resembling milk fat.

8. A process according to claim 7 wherein said temperature is within the range of 50° to 60°C.

9. A process according to claim 8 wherein the amount of said coagulant is within the range of 0.5 to 1 weight percent, based on the weight of said soy milk.

10. A process according claim 7 wherein a flavor producing proteolytic enzyme is added either to said soy milk prior to formation of said emulsion, or to said emulsion prior to the initiation of the fermentation, or to said curd after cooking.

11. A process according to claim 9 wherein said coagulant is D-glucono-δ-lactone.

* * * * *